July 23, 1968  S. A. LIPPMANN  3,394,275
VIBRATION TRANSDUCERS
Filed Feb. 9, 1966  2 Sheets-Sheet 1
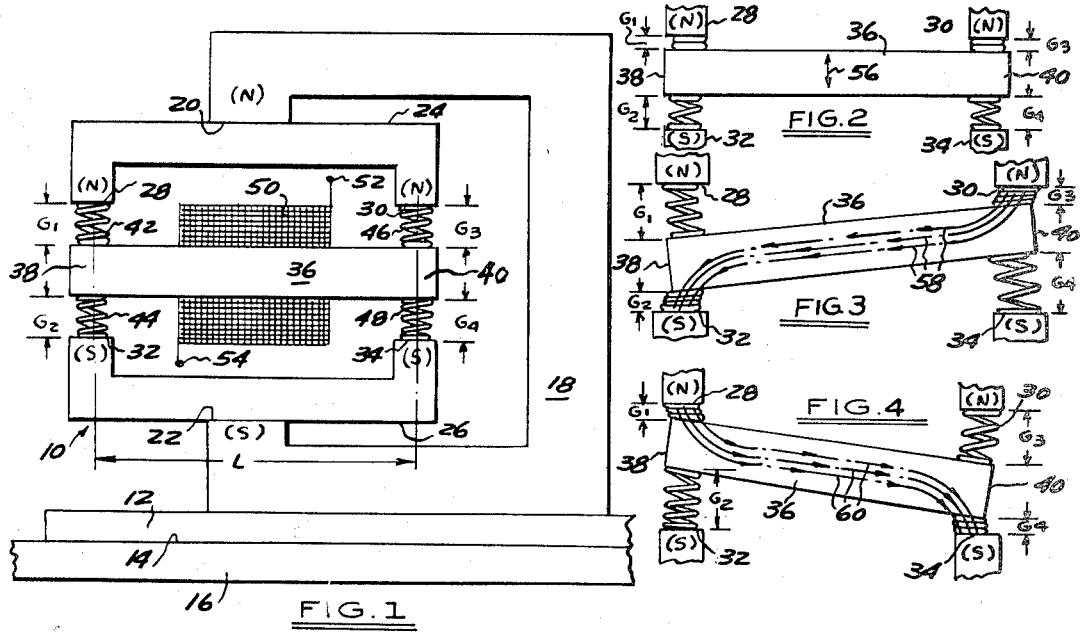
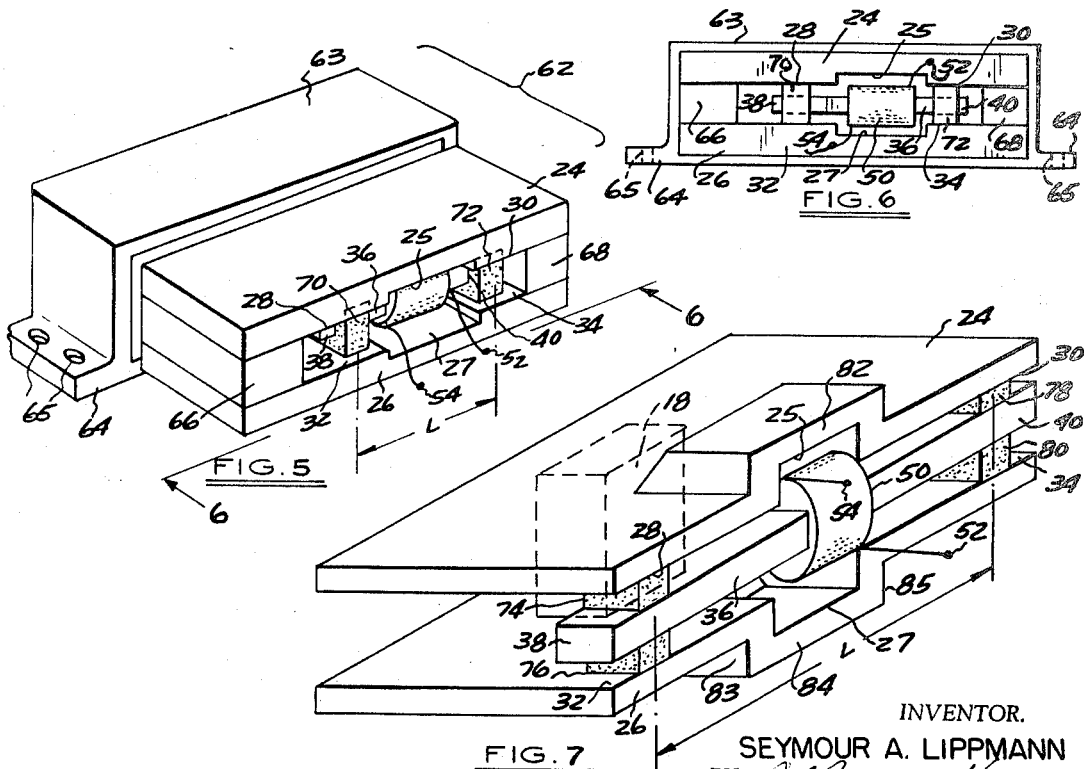
INVENTOR.
SEYMOUR A. LIPPMANN
ATTORNEYS

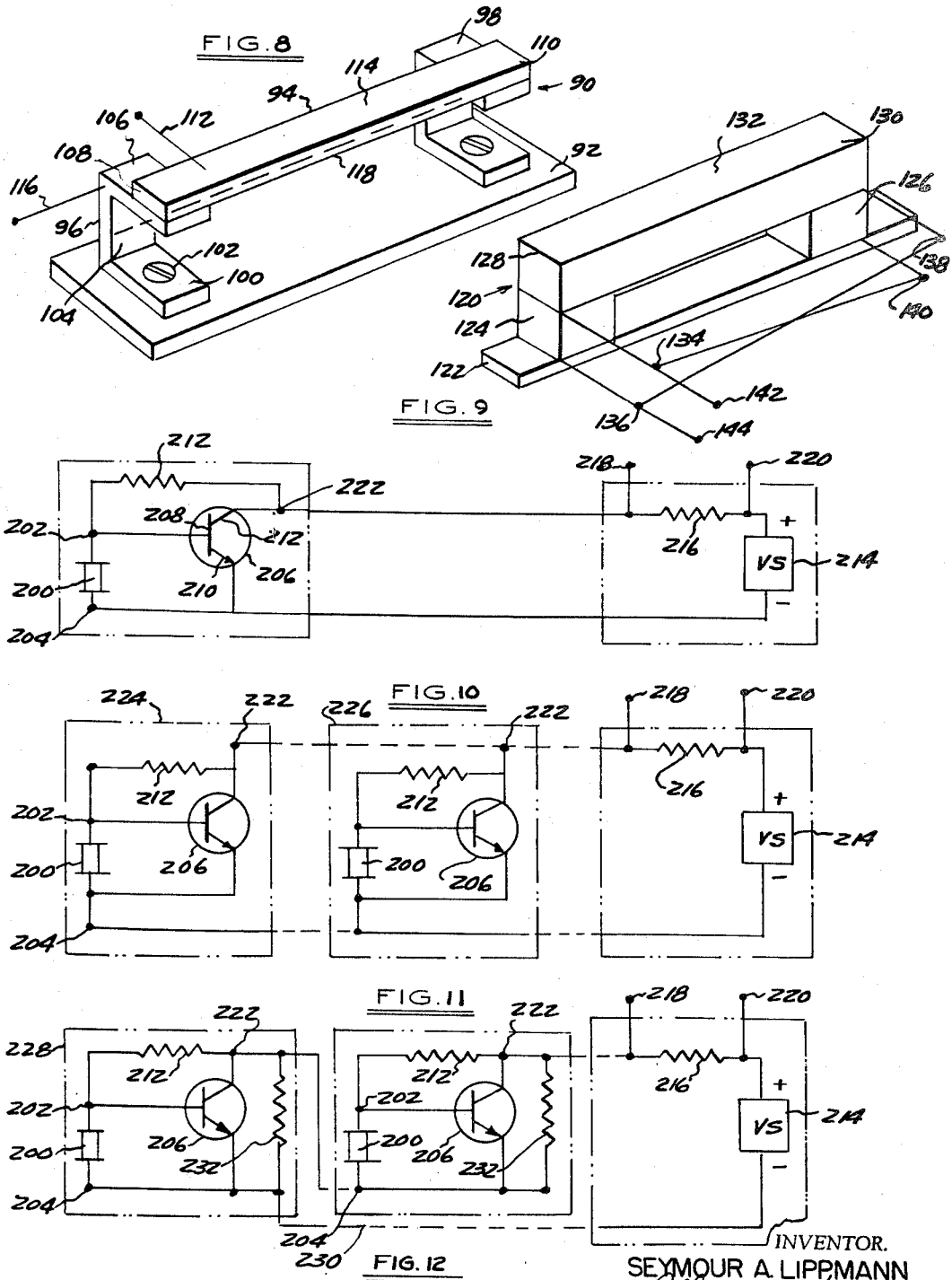

United States Patent Office 3,394,275
Patented July 23, 1968

3,394,275
VIBRATION TRANSDUCERS
Seymour A. Lippmann, Detroit, Mich., assignor, by mesne assignments, to Federal Electronics, Inc., Wyandotte, Mich., a corporation of Michigan
Filed Feb. 9, 1966, Ser. No. 526,261
10 Claims. (Cl. 310—8.3)

The present invention relates in general to vibration transducers, and more particularly to vibration detectors and sensors capable of generating an alternating electrical signal output as a result of being subjected to vibrations of a given frequency range.

The invention has particular application to devices for detecting burglaries accompanied by an act of destruction, and is particularly adapted to be used as one of the inputs to a burglar alarm system such as described and claimed in co-pending patent application, Ser. No. 455,473, filed May 13, 1965. That application teaches an electronic alarm system employing circuits which receive inputs from one or more transducers operative to sense any of a variety of physical conditions such as an unusual noise level, vibrations, excessive temperature, disturbance of doors and windows, etc., and to generate an electric signal indicative of the condition. The electrical signal from any transducer is applied to the alarm circuit which, upon receiving an input signal above a threshold level, becomes operative to provide an output signal for a predetermined length of time, independent of the duration of the input signal. The output may take a variety of form such as an audible alarm, a flashing light, etc., or any combination thereof.

The present invention takes cognizance of the fact that entrance to a building during the commission of an act of burglary is not often gained by usual channels such as door or windows that may be forced open while remaining otherwise integral, but through the partial or total destruction of walls, ceilings, floors, doors, or windows. Many excellent devices are now generally commercially available for detecting the opening of windows or doors, but no entirely satisfactory detecting devices exist at the present for sensing or detecting an act of forceful penetration of an enclosure by way of partial destruction of the integrity of the enclosure.

Windows are commonly protected against burglary by means of tapes, made of metallic foil, which are adhered to the glass by cementing or bonding such that breakage of the glass causes breakage of the tape resulting in an open electrical circuit. This, in turn, cause an appropriate alarm system to trip. However, window tapes are unsightly and often fail due to corrosion or to loss of adherence to the glass, and they are costly to install and maintain. Furthermore, tapes are far from being foolproof as they can be easily by-passed by careful cutting of the glass by means of a glass cutter in such a way that the tape is not severed, although an area large enough to offer access to the enclosure may be cut off and removed from the glass pane. In addition, tapes sometimes can be broken or cut without opening an electrical circuit if the precaution is taken of previously short-circuiting, by means of a jumper wire, the portion of the tape that it is sought to be removed.

No system similar to that of tape windows exists for walls, floors, and ceilings. Generally, conductive tapes disposed at the edge of a wall, floor or ceiling would not accomplish any useful purpose because there is generally no extensive propagation of cracks, during forceful entry of an enclosure, that would result in breakage of the tape. Tapes, if used for such a purpose, would have to be criss-crossed back and forth on the surface to be protected, or within the wall, ceiling or floor. Consequently such a burglar alarm system is difficult to install, must generally be planned in advance of the construction of the building and is prohibitively high in cost.

The integrity of walls, ceilings or floors of an enclosure can however be protected by means of vibration detectors or sensors which can be attached to doors, windows, walls, floors or ceilings. Unfortunately, ordinary vibration detectors or sensors, as are well known and as are commonly found in the art, will generally cause false alarms, because walls, windows, floors and ceilings are subject to many sources of vibrations other than those resulting from a forceful break-in. Such vibrations may originate from machinery within the building or from exterior sources such as automobile traffic, thunder, wind gusts and the like.

These inconveniences and shortcomings are remedied by the present invention which provides vibration detectors or sensors which are particularly well adapted as burglary alarm detectors and sensors, and which are not prone at giving false alarms when excited by other causes than an attempted or actual act of fracturing or breaking a surface such as a window, a wall, a ceiling or a floor.

It has been discovered by the applicant that when a surface such as a window, a wall, etc., is fractured or acted upon for the purpose of gaining forceful illegal entry to an enclosure so that the integrity of the surface is disturbed or disrupted, transverse waves are thereby generated, and are propagated along the surface. Such transverse waves occupy a substantially broad frequency range but have generally a substantially short wave-length. The result of such substantially short wave-length waves traveling along the surface is that each elementary point of the surface tends to vibrate with slight differences between adjoining points in motions because of the finite propagation velocity, in directions substantially perpendicular to the plane of the surface. Thus every arbitrarily chosen imaginary elementary length of the surface tends to tilt or rotate slightly and rapidly. This effect on each elementary length of the surface is much like the effect of the waves of an ocean upon a small boat which is caused to rock and pitch as the waves pass by underneath. However, disturbances caused by exterior phenomena, such as wind or airborne noises, tend to act upon a surface of an enclosure in substantially extensive areas causing lateral displacement of the surface so that any given elementary length thereof is translated with both ends moving in the same direction, this direction being substantially perpendicular to the plane of the surface and this substantially linear motion being accompanied by no or little local rocking or rotating motion of such given elementary length. These disturbances of exterior origin have generally a long wave-length and consequently a substantially low frequency. High frequency vibrations that originate outside of the enclosure, and which might otherwise resemble those produced upon the surface as a result of attempted or actual forceful break-in, are conducted to the surface through transmission media such as air, window sash, etc., and such vibrations are generally highly attenuated before activating the surface, the attenuation resulting from the usual miss-match of the mechanical impedances.

Hence, a vibration detector or sensor according to the principles of the invention, affixed to a surface being monitored for break-in, is capable of converting the high frequency rocking motions to which the detector or sensor on the surface is being subjected to an electrical signal capable of tripping a burglary alarm. In addition, a detector or sensor according to the invention is substantially insensible to non-rocking motions of the surface at right angles to the plane thereof or along the plane thereof.

Consequently, the principal object of the invention is to provide sensors or detectors attached to a surface to be protected and capable of detecting the vibrations generally accompanying the fracturing or attempt to fracture the surface, and which is substantially insensible to vibration due to causes other than vibrations accompanying a break-in or an attempt to break-in, which could trip a false alarm.

Another object of the invention is to provide a sensor or detector which is not subject to electrical hum or ambient electrical noise pick-up which may tend to set off false alarms.

A further object of the invention is to provide a sensor or detector of the character indicated which is not costly to manufacture, which is easily assembled, which is substantially small in size so as to be relatively inconspicuous and which is reliable and substantially fool-proof in operation.

Other object and advantages of the invention will become apparent when the following description and claims are considered in conjunction with the accompanying drawings wherein like or equivalent elements are designated by the same reference numerals and in which:

FIG. 1 is a schematic representation of an example of a transducer according to the present invention;

FIGS. 2 to 4 are partial simplified schematic illustrations used for better comprehension of the principles of operation of the transducer of FIG. 1;

FIG. 5 is a perspective view of a commercial embodiment of the example of transducer of FIG. 1;

FIG. 6 is a front elevation view of the transducer of FIG. 5 as seen from line 6—6 of FIG. 5;

FIG. 7 is a modification of the transducer of FIGS. 5–6;

FIG. 8 is another example of a transducer embodying the principles of the invention;

FIG. 9 is a modification of the transducer of FIG. 8;

FIG. 10 is an example of an electrical circuit for amplifying the electrical signals available at the output of a transducer according to the invention;

FIG. 11 is a circuit diagram showing a plurality of amplification circuits according to FIG. 10 connected in parallel to a utilization circuit; and FIG. 12 is a view similar to FIG. 11, but showing a plurality of amplification circuits connected in series to a utilization circuit.

Referring now to the drawings, and more particularly to FIG. 1 thereof, a vibration sensor or detector according to the invention, represented generally by numeral 10, comprises a base 12 affixed by any conventional means such as cementing, bonding, or screwing to a surface 14 of a window, floor, wall, ceiling or the like, designated by reference numeral 16. Vibrations as a result of, for example, an attempt to gain forceful unlawful entry through the window, floor, wall or ceiling of the enclosure which it is desired to protect are capable of propagation in a wavelike fashion along the surface 14.

A C-shaped "horseshoe" permanent magnet 18 is affixed to the base 12 so that the pole faces 20 and 22 of the magnet form a substantially wide gap for a magnetic field having its axis substantially perpendicular to the plane of the surface 14. Two C-shaped pole pieces 24 and 26, made of magnetically permeable material such as iron, nickel-iron alloys, ferrites, and the like, are disposed within the gap so that the pole faces 28 and 30 of pole piece 24 are placed opposite pole faces 32 and 34, respectively, of pole piece 26. A core bar 36, made of material similar to the material of the pole pieces 24 and 26 which is magnetically permeable as well as magnetically non-retentive, is disposed with both its ends 38 and 40 situated within the gap formed between pole faces 28–32 and pole faces 30–34, respectively. The end 38 of core bar 36 is normally maintained at equal distances from pole faces 28 and 32 by means of resilient members such as coil springs 42 and 44. Similarly, the other end 40 of the core bar 36 is maintained at equal distances from pole faces 30 and 34 by means of resilient members such as coil springs 46 and 48. The position of the core bar 36 with both its ends within the air gaps thus define secondary air gap $G_1$ between pole face 28 and end 38, and secondary air gap $G_2$ between end 38 and pole face 32. Similarly, end 40 of core bar 36 normally divides the air gap between pole faces 30 and 34 into two substantially equal secondary gaps $G_3$ and $G_4$.

A coil 50, made of several turns of electrical wire, is wound around core bar 36 and is provided with terminals 52 and 54.

As indicated on FIG. 1, pole face 20 of magnet 18 has been arbitrarily chosen as being of north polarity and pole face 22 as being of south polarity. Consequently, pole faces 28 and 30 of pole piece 24 are also of north polarity and pole faces 32 and 34 of pole piece 26 are of south polarity.

As long as the detector or sensor 10 is disposed on a surface 14 which remains motionless, the core 36 occupies the position indicated on FIG. 1 and the magnetic loop generated by the magnet 18 is closed through the two pairs of north-south gaps each one of which consists respectively of gaps $G_1$ and $G_2$, and gaps $G_3$ and $G_4$, with little or no magnetic flux flowing longitudinally through the core bar 36. Also, as long as the surface 14 is vibrated in such a manner that the base 12 is displaced in a direction perpendicular to the plane of the surface 14 so as to remain at all times substantially parallel to its initial position, core bar 36, in view of its moment of inertia, is caused to vibrate in the direction indicated by arrows 56, FIG. 2, with both ends 38 and 40 oscillating substantially in phase so that the axis of the core bar remains at all times both substantially parallel to its initial position and parallel to the base 12 and surface 14, gap $G_1$ remaining substantially equal to gap $G_3$ and gap $G_2$ remains substantially equal to gap $G_4$. Under those conditions also, little or no magnetic flux flows along core bar 36.

However, as soon as the vibrations propagating along the surface 14 are of such an amplitude and frequency range that the base 12 is caused to rock or swing back and forth with an alternating rotation-like motion, the moment of inertia of the core bar 36 and the resilient suspension of the two ends 38 and 40 thereof cause the core bar to be affected by an alternating vibratory rotary motion which causes the ends of the core bar to oscillate in opposite directions, or substantially 180° out of phase. Thus the core bar 36 momentarily occupies the position schematically indicated in FIG. 3, with gap $G_3$ momentarily becoming smaller than gap $G_4$, while at the same time gap $G_2$ becomes momentarily smaller than gap $G_1$. This momentary position of core bar 36 causes a lowered magnetic reluctance path to be established across narrow gap $G_3$ between pole face 30 of north polarity and end 40 of the core bar 36, and a lowered magnetic reluctance path to also be established across end 28 of the core bar and the magnetic south pole of pole face 32. Consequently, magnetic lines of force, indicated arbitrarily by arrows 58 in FIG. 3, circulate through the core bar from right to left, as seen in FIG. 3. Core bar 36 continuing to swing rotationally around its center of gravity relatively to the pole faces is subsequently caused to occupy momentarily the position illustrated in FIG. 4. The reduced reluctance path across gaps $G_1$ and $G_3$ now closes the magnetic loop through the core bar from north pole to south pole in the direction of end 38 to end 40 of the core bar 36, as shown by arrows 60 in FIG. 4. The oscillations of the core bar 36 in relation to the pole faces of pole pieces 24 and 26 thus cause alternating magnetic lines of force to flow back and forth from end 38 to end 40 of core bar 36, and from end 40 to end 38 of the core bar, the alternating magnetic flux flowing through the core in turn inducing an alternating electrical signal in the electric coil 50 wound around the core bar, such electrical signal appearing across the terminals 52–54 of the coil.

If the base 12 and consequently magnet 18 and pole pieces 24 and 26 are vibrated in a direction parallel to the surface 14, core bar 36 also vibrates while always remaining parallel to surface 14. Gaps $G_1$, $G_2$, $G_3$ and $G_4$ remain substantially equal to each other, and no magnetic lines of force flow longitudinally along the core bar 36, resulting in the absence of an electrical signal across terminals 52–54 of coil 5.

The moment of inertia of the core bar 36 and the stiffness constant of the springs 42–48 are arbitrarily chosen to favor the frequencies which accompany break-ins, or attempt to break into the protected enclosure. These frequencies depend upon the material, size, thickness, etc., of the monitored structure, and it is common for these frequencies to reach into the upper part of the audio range, for example, 10 kilocycles. For some very hard and light structures, these frequencies may, however, extend into the supersonic range, for example, as high as 200 kilocycles. Structures made of very flexible or dense materials require detecting devices operating generally at the lower audio frequencies, such as for example about 30 cycles. The frequency emphasized by a detecting device, or transducer, according to the invention, depends on the mechanical resonance of the transducer and follows generally the formula:

$$f = \frac{I}{2\pi}\sqrt{\frac{1}{4KL}}$$

Where $I$ is the moment of inertia of the core bar about its center of gravity;

$K$ is the individual rate of each of the four springs; and $I$ is the spacing of the springs, as shown in FIG. 1.

FIGS. 5–6 represents an example of a commercial transducer according to the invention. The transducer 62 comprises a housing 63 provided with flanges 64 having mounting holes 65. Within the housing 63, which is made of non-magnetic material such as aluminum, copper, plastic, or the like, are disposed pole pieces 24 and 26 held substantially parallel to each other by means of magnet block 66 and spacer block 68, it being evident that spacer block 68 may also be a magnet block substantially similar to magnet block 66. It is obvious that when both blocks 66 and 68 consist of magnets they must be orientated in the same direction so as to cause pole piece 24 to define two pole faces 28 and 30 of the same polarity, and pole piece 26 to define two pole faces 32 and 34 of the same polarity, the polarity of pole faces 32 and 34 being opposite to the polarity of pole faces 28 and 30. Pole piece 24 presents a cut-out indented portion 25 affording clearance for the coil 50, and pole piece 26 is indented in the same manner as shown at 27. Coil 50, provided with output terminals 52 and 54, is disposed around core bar 36 having its ends 38 and 40 disposed respectively in the gaps formed by pole faces 28 and 32 and pole faces 30 and 34, respectively. The ends 38 and 40 of core bar 36 are maintained resiliently in a substantially midposition in each gap by means of resilient blocks 70 and 72, made of rubber or similar material.

The operation of transducer 62 is according to the principles explained hereinbefore and as in conjunction with the illustrations of FIGS. 1–4. It is evident that transducer 64 of FIGS. 5–6 detects or senses oscillatory motions of appropriate frequencies directed to tilt the planes of pole pieces 24 and 26, that is oscillations directed substantially at right angle to the plane of mounting flanges 64.

FIG. 7 represents a modification of a transducer according to the invention which presents over the example of FIGS. 5–6 the added advantage of simpler and cheaper construction. In this example of the invention, the magnetic lines of force created by straight magnet block 18 are directed by pole pieces 24 and 26 to a pair of gaps formed by pole faces 28 and 32 and pole faces 30 and 34 of respectively pole piece 24 and pole piece 26. The end 38 of the core bar 36 is maintained at substantially equal distances from pole faces 28 and 32 by means of resilient blocks 74 and 76, and the end 40 of the core bar is maintained, in the same manner, substantially equidistant from pole faces 30 and 34 by means of resilient blocks 78 and 80. A coil 50 is wound around core bar 36 and is provided with terminals 52 and 54 across which appear alternating electric signals induced by reversals of the magnetic lines of force flowing longitudinally along core bar 36 when the two ends thereof vibrate in opposite directions according to the principles hereinbefore explained. Pole piece 24 is provided with an outwardly projecting portion 82 forming a recess 25 on its side disposed toward the coil 50, and pole piece 26 is similarily provided with a projecting portion 84 forming a recess 27 on its side disposed toward the coil 50.

FIG. 8 represents a modification of the invention wherein the operation of the transducer is based on the well known phenomenon of piezoelectricity. A transducer, designed generally by numeral 90, is provided with a base 92 for attachment to a surface. A bar 94 made of piezoelectric material, such as quartz, Rochelle salt, tourmaline, barium titanate and the like, and having a predetermined mass and length so as to be endowed with a predetermined moment of inertia, is held a given distance away from the base 92, substantially parallel thereto, by means of a pair of substantially C-shaped brackets 96 and 98. Each bracket comprises a bottom portion 100, as seen in the drawing, cemented, bonded, or fastened by means of a screw 102, to the base 92, a vertically disposed, as seen in the drawing, portion 104 and a bent over top portion 106, substantially parallel to the base 92 and on the top of which is bonded, cemented, or soldered the ends of the piezoelectric bar 94, bracket 96 supporting an end 108 of piezoelectric bar 94 and bracket 98 supporting the other end 110 thereof. A terminal 112 is electrically connected to a conductive layer or film 114 disposed on one face of the piezoelectric bar 94, the upper face as seen in the drawing, and a second terminal 114 is electrically connected to a similar conductive layer or film 118 on an opposite face of the bar.

When the surface on which is affixed base 92 is vibrated such that the base is affected with a rocking motion which causes the two brackets 96 and 98 to be subject to alternating motions or vibrations at right angle to the base 92 and directed in opposite directions, the piezoelectric bar 94 is thus caused to bend in an oscillatory manner. The oscillatory bending of the piezoelectric bar 94 in alternate opposite directions causes an alternating bending moment to occur in the piezoelectric bar 94 and this moment has the same direction throughout the bar. Electric charges of opposite directions consequently appear, according to the well known principles of piezoelectricity, on opposite faces of the bar and are detected by the conductive layers or films 114 and 118. Consequently an alternating electrical voltage appears across the terminals 112 and 116, this alternating electrical voltage being representative of the vibrations of the surface monitored by the transducer.

FIG. 9 represents a modification of the piezoelectric transducer of FIG. 8 wherein the transducer 120 comprises a base 122 for affixing to the surface to be monitored, supporting by means of piezoelectric crystals 124 and 126 the ends 128 and 130, respectively, of a bar 132 of a predetermined length and mass so as to have a predetermined moment of inertia. When the base 122 affixed to the surface of subjected to a vibratory swinging or rocking motion resulting from propagation of waves of an appropriate frequency across the monitored surface, crystals 124 and 126 are alternately and oppositely compressed and relaxed or extended against the opposing force of inertia of the bar 132. Consequently, on two opposite faces of the piezoelectric crystal 124 appears an alternating electromotive force detected by conductive layers or films (not shown) connected to terminals 134 and 136. On opposite faces of piezoelectric crystal 126 also appears an alternating electromotive force detected by conductive layers or film (not shown) connected to terminals 138 and 140. The electromotive force, or alternating voltage, originating from crystal 124 is of opposite phase, or rotated 180 degrees in phase as compared to the alternating voltage originating from crystal 126.

Consequently, if the two crystals are connected in parallel so that terminal 134 of crystal 124 is connected to terminal 140 of crystal 126 and terminal 136 of crystal 124 is connected to terminal 138 of crystal 126, the phases of the alternating voltages generated by the pair of piezoelectric crystals which are normally rotated 180 degrees out of phase from each other are now caused to be in phase coincidence and appear across terminal 132, common to both terminals 134 and 148, and terminal 144, common to both terminals 136 and 138, as an alternating voltage signal of amplitude equal to the sum of the amplitudes of the alternating signals generated by each crystal.

It can be seen that oscillations of the surface on which is placed the base 92 of transducer 90 of FIG. 8 which are directed in the plane of base 92 create no bending moment of the piezoelectrical bar 94 thus resulting in no electrical signal appearing across terminals 112–116. Similarly, motion of the base 92 displacing in phase both ends 108 and 110 of the piezoelectric bar 114 against the moment of inertia of the bar results in equal and opposite bending moment in the two halves of the bar, thus resulting in no net electrical charge appearing on the conductive layers 114 and 118 and at terminals 112–116. Even though the piezoelectric bar 114 may bend or bow slightly under those conditions, the bar is so constructed that the piezoelectric charges from the faces thereof, as detected by layers or films 114 and 118, cancel each other.

When the transducer 120 of FIG. 9 is subjected to vibratory oscillations displacing ends 128 and 130 of bar 132 in the same direction and in coincidence of phase, the 134–136 and 138–140 are substantially equal and in phase. Consequently, due to the criss-cross connection of the terminals, these signal cancel each other and no resultant signal appears across terminals 142–144. Oscillatory vibrations directed along the plane of the base 122 causes no compression and relaxation stresses in the piezoelectric crystals 124 and 126 so that no alternating electrical signal appears on opposite faces thereof and, consequently, the transducer supplies no output signal across terminals 142–144.

Piezoelectric crystals are devices which inherently have a substantially large electrical impedance and which generally generate very small voltages and currents. Consequently, if the signals derived from the piezoelectric transducers of FIGS. 8 and 9 were directly fed to a utilization circuit by means of the substantially long lead-in wires generally necessitated by the location of the transducers away from the utilization circuit, such arrangement would be somewhat unreliable in a burglar alarm system because of probable inductive and capacitive pick-up of electrical noise. However, if the signal generated by the piezoelectric transducer is amplified in voltage and current before being supplied to a utilization circuit, the signal-to-noise ratio of the signal is thus considerably increased and the chances of obtaining a false alarm are proportionally decreased. If, in addition, the output impedance of the amplifier is small, then for that reason as well, pick-up of electrical noise is substantially small and the signal-to-noise ratio is thereby reduced, furthermore reducing the possibility of false alarms. A substantially simple amplification circuit has been devised primarily for use with the piezoelectric transducers of FIGS. 8 and 9, and such a circuit is schematically represented in FIG. 10.

The schematic circuit diagram of FIG. 10 shows a piezoelectric transducer 200 provided with terminals 202 and 204. A transistor 206, arbitrarily chosen to be an NPN transistor, has its base 208 and its emitter 210 placed across terminals 202–204 of the transducer. The base 208 of the transistor is biased by means of resistor 212 connected between the base 208 and the emitter 212 thereof. The circuit of the collector 212 and emitter 210 of the transistor 206 is connected across a DC voltage supply 214, a load resistor 216 being disposed in series in the collector circuit. The small alternating signal, low in current and voltage, appearing across terminal 202–204 of the transducer and circulating in the base 208-emitter 210 circuit of transistor 206 is thus amplified in the collector 212-emitter 210 circuit of the transistor, and the substantially large alternating current flowing through load resistor 216 results in a substantially large alternating voltage appearing across the load resistor, resulting in substantially large voltage signals being available, via connector 218 and 220 to the input of a utilization circuit (not shown) such as a burglar alarm system, which may be one of the systems disclosed and claimed in co-pending patent application Ser. No. 455,573.

It is evident that the NPN transducer 206 may be replaced by a PNP transducer, as long as the respective voltage polarities are reversed.

The amplification circuit of transistor 206 may be disposed in a module or on a chip attached directly to the transducer in any convenient manner or situated proximate to the transducer so that substantially large signals are fed to the input of the utilization circuit, thus minimizing the interference of noise pick-up by the connections between the transducer output and the utilization circuit input.

Although electromagnetic transducers such as those of the examples of FIGS. 1, 2, and 7, wherein the detecting means comprises a substantially small coil consisting of a few hundred turns of low resistance wire wound around the core bar has an electrical impedance which is substantially low in relation to usual power line frequencies, thus shunting most common spurious signals that might otherwise be picked up by the cables or wires connecting the transducer output to the utilization circuit input, in many applications of the invention however, because of the substantially long leads connecting the detecting device to the utilization circuit, it is nevertheless often desirable to incorporate within the housing of the detector or sensor transducer, or in close proximity therewith, an amplification circuit according to FIG. 10.

FIG. 11 represents schematically how several transducers 200 which, as previously indicated, may be either a piezoelectrical transducer as shown or an electromagnetic transducer according to the invention, which together with their respective amplification circuits are designated generally by reference numerals 224, 226, etc., may be connected in parallel, with a common voltage supply 214 and load resistor 216 connected across the respective output terminals 204 and 222 of each individual circuit. In this manner, an alternating current appearing across the output of any one of the several circuits causes a voltage differential to appear at terminals 218–220 across load resistor 216 for connection to the input of a utilization circuit (not shown).

FIG. 12 shows how the output of several individual circuits 228, 230, etc., may also be connected in series. Resistors 232 are connected across the emitter and collector of each of the transistors 206 and the values thereof are chosen so as to provide operating voltages of equal magnitude for each transistor.

It can thus be seen that the invention provides means for converting the vibratory oscillations of a surface being monitored into useful electrical signals. More particularly, the invention provides detector or sensor transducers of a type capable of detecting or sensing the oscillating vibrations of a surface accompanying attempts to break-in or actual break-in of an enclosure which is sought to be protected. Transducers according to the invention may be placed on different surfaces of an enclosure for efficiently protecting said enclosure against forceful unauthorized breaking and entering by supplying at their outputs electrical signals capable of tripping a device such as a burglar alarm system.

The examples of the invention herein given have been illustrated and described for illustrative purposes only to suggest a few of the possible structures and combinations contemplated. It will be apparent to those skilled in the art that there is a great number of such possible structures and combinations falling within the scope of the appended claims. It is also obvious that various changes, additions, and omissions of element may be made in details within the scope and spirit of the invention and that, particularly in the examples of the invention illustrated in FIG. 1, FIGS. 5–6, FIG. 8 and FIG. 9, the plate forming the support base for the transducer may be omitted and the transducer may be directly attached to the surface to be protected, and it is, therefore, to be understood that the invention is not to be limited to the specific details, examples, and preferred embodiments shown and described.

What is claimed as new is:

1. A vibration sensor adapted to be mounted on a surface for detecting vibratory waves propagated substantially along said surface and tending to impart an alternating rocking motion to said sensor, said sensor being substantially insensible to alternating translating motions affecting said surface, said sensor comprising:
    means attached to said surface for producing a substantially constant magnetic field;
    two pairs of pole pieces in said magnetic field defining two separate substantially equal primary air gaps of same magnetic direction;
    an elongated magnetically permeable core disposed with each end thereof situated in each of said primary gaps, said core having a predetermined moment of inertia;
    means resiliently maintaining each said end substantially centered in each of said primary gaps so as to divide each of said primary gaps into two substantially equal secondary air gaps; and
    an electric coil coaxially wound around said core between said ends thereof for converting magnetic flux reversals along said core to alternating electrical signals induced in said coil;
    whereby rocking motions of said core causing alternating variable reluctance paths across secondary gaps on the same side of said core cause alternating magnetic fluxes along the length of said core from end to end inducing said alternating electrical signals in said coil and translating motions of said core causing variable reluctance paths on opposite sides of said core result in an absence of alternating magnetic flux reversal along the length of said core.

2. The vibration sensor of claim 1 wherein at least one amplification stage is provided in close proximity to said sensor for amplifying said electrical signals for supplying amplified signals to a utilization circuit.

3. A vibration sensor adapted to be mounted on a surface for detecting vibratory waves propagated substantially along said surface and tending to impart an alternative rocking motion to said sensor, said sensor being substantially insensible to alternating translating motions affecting said surface, said sensor comprising:
    an elongated piezoelectric bar adapted to generate an alternating electric signal on two opposite faces thereof when bent in a predetermined manner;
    support means on both ends of said piezoelectric bar for mounting upon said surface; and
    electrical terminals connected to said two opposite faces of said piezoelectric bar;
    wherein said bar is adapted to generate alternating electrical signals across said terminals when said vibratory waves cause oscillatory bending of said piezoelectric bar as a result of said support means being oscillatorily displaced in opposite directions relative to each other, whereby said piezoelectric bar does not generate alternating electrical signals when said support means are displaced in the same direction.

4. The vibration sensor of claim 3 wherein at least one amplification stage is provided in close proximity to said sensor for amplifying said electrical signal for supplying amplified signals to a utilization circuit.

5. A vibration sensor adapted to be mounted on a surface for detecting vibratory waves propagated substantially along said surface and tending to impart an alternating rocking motion to said sensor, said sensor being substantially insensible to alternating translating motions affecting said surface, said sensor comprising:
    an elongated bar member having a predetermined moment of inertia;
    a piezoelectric crystal supporting each end of said bar member away from said surface;
    electrical terminals connected to two opposite faces of each said piezoelectric crystal and disposed so as to detect alternating electrical signals generated as the result of alternating compression and relaxation stresses of each said crystal;
    whereby alternating electrical signals of substantially opposite phase appear at each crystal pair of terminals when said crystals vibrate in opposite directions against the force of inertia of said bar member and alternating electrical signals substantially of same phase appear at each pair of said terminals when said crystals vibrate in the same direction.

6. The vibration sensor of claim 5 wherein at least one amplifier stage is provided in close proximity to said sensor for amplifying said electrical signals for supplying amplified signals to a utilization circuit.

7. Means normally mounted on a surface for sensing undulatory waves propagated substantially along said surface and tending to impart an alternating rocking motion to said means, said means comprising:
    a member possessed of a predetermined moment of inertia;
    means supporting said member away from said surface; and
    means adapted to generate an alternating electrical signal when said member is caused to rock under the influence of said undulatory waves propagated along said surface;
    said last mentioned means being further adapted to remain indifferent to any motion of said member other than rocking motion.

8. The means of claim 7 wherein said member comprises:
    an elongated bar of magnetically permeable material resiliently suspended with each end thereof disposed in one of a pair of magnetic fields of substantially equal intensity and directed in the same direction;
    and wherein said means adapted to produce an alternating electrical signal comprises:
    an electric coil wound around said bar in such a manner that an alternating electrical signal is induced in said coil as a result of alternating magnetic fluxes through said bar, said alternating magnetic fluxes being caused by the rocking motions of said bar causing the ends thereof to oscillate in opposite directions in said magnetic fields and no signal is induced in said coil by translating motions of said bar causing said ends thereof to oscillate simultaneously in the same directions as said magnetic fields.

9. The means of claim 7 wherein said member comprises:
    a bar of piezoelectric material rigidly supported on both ends thereof away from said surface;
    and wherein said means adapted to produce an alternating electrical signal comprises:
    electrical terminals of two opposite faces on said bar to generate an alternating electrical signal as a result of bending stresses imposed upon said bar, said bending stresses being caused by the alternating motions of both ends of said bar oscillating in opposite directions, whereby no alternating electrical signal is generated by translating motions of said bar causing said ends thereof to oscillate simultaneously in the same direction.

10. The means of claim 7 wherein:

the means supporting said member away from said surface comprises a pair of piezoelectric elements, each one of which is adapted to support each end of said member;

each one of said piezoelectric elements being capable of generating alternating electrical signals when vibrated by said surface against the inertia of said member whereby alternating electrical signals of substantially opposite phase are generated by said elements when vibrated simultaneously in opposite directions and alternating electrical signals of substantially same phase are generated thereby when vibrated simultaneously in the same direction.

References Cited

UNITED STATES PATENTS

| | | | |
|---|---|---|---|
| 1,866,267 | 7/1932 | Nicolson | 310—8.4 |
| 1,902,184 | 3/1933 | Rieber | 310—8.4 |
| 2,426,322 | 8/1947 | Pridham | 310—15 |
| 2,443,969 | 6/1948 | Tyler | 310—15 |
| 2,784,327 | 3/1957 | Drescher | 310—15 |
| 3,320,582 | 5/1967 | Sykes | 310—8.1 |

J. D. MILLER, *Primary Examiner.*